US011018773B1

(12) United States Patent
Lantz et al.

(10) Patent No.: US 11,018,773 B1
(45) Date of Patent: May 25, 2021

(54) CASCADED OFFSET OPTICAL MODULATOR FOR OPTICAL COMMUNICATIONS

(71) Applicant: United States of America as represented by the Administrator of NASA, Washington, DC (US)

(72) Inventors: Nicholas C. Lantz, Cleveland, OH (US); Jennifer N. Downey, Cleveland, OH (US); Brian E. Vyhnalek, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 16/662,955

(22) Filed: Oct. 24, 2019

Related U.S. Application Data

(60) Provisional application No. 62/751,124, filed on Oct. 26, 2018.

(51) Int. Cl.
*H04B 10/00* (2013.01)
*H04B 10/524* (2013.01)
*G02F 1/21* (2006.01)

(52) U.S. Cl.
CPC ............ *H04B 10/524* (2013.01); *G02F 1/21* (2013.01); *G02F 1/212* (2021.01)

(58) Field of Classification Search
CPC ..................... H04B 10/524; G02F 2001/212
See application file for complete search history.

(56) References Cited

U.S. PATENT DOCUMENTS

| 5,278,923 | A | * | 1/1994 | Nazarathy | G02F 1/225 385/1 |
| 5,321,543 | A | * | 6/1994 | Huber | H04B 10/5051 398/194 |
| 6,236,488 | B1 | * | 5/2001 | Shimizu | G01J 11/00 398/154 |
| 6,538,787 | B1 | * | 3/2003 | Moeller | G02B 6/272 359/249 |
| 6,643,051 | B1 | * | 11/2003 | Fuerst | G02F 1/0327 359/279 |
| 8,665,985 | B1 | * | 3/2014 | Piesinger | G01S 13/782 375/268 |
| 2003/0030882 | A1 | * | 2/2003 | Garrett | G02F 1/0121 359/246 |
| 2003/0128906 | A1 | * | 7/2003 | Bulow | H04B 10/2569 385/4 |

(Continued)

*Primary Examiner* — David C Payne
*Assistant Examiner* — Pranesh K Barua
(74) *Attorney, Agent, or Firm* — Robert H. Earp, III; Mark Wolfgang; Helen M. Galus

(57) ABSTRACT

A cascaded modulator system configured to minimize the extinction ratio (ER) of an optical output of an optical transmitter. The cascaded modulator system includes a pulse position modulation (PPM) source connected to a plurality of serially-connected Mach Zehnder Interferometer (MZIs). A variable time delay $\Delta t_d$ may be applied to a negative low voltage differential signal (LVDS) driving a second or later MZI of the plurality of MZIs to eliminate or compensate for one or more non-idealities in an electrical signal.

17 Claims, 9 Drawing Sheets

(56) References Cited

U.S. PATENT DOCUMENTS

| | | | | |
|---|---|---|---|---|
| 2003/0128923 A1* | 7/2003 | Takiguchi | ............ | H04B 10/503 |
| | | | | 385/27 |
| 2012/0087653 A1* | 4/2012 | Sawada | .............. | H04B 10/5051 |
| | | | | 398/25 |
| 2013/0315524 A1* | 11/2013 | Saida | ....................... | G02F 1/011 |
| | | | | 385/3 |
| 2016/0103340 A1* | 4/2016 | Ding | ....................... | G02F 1/025 |
| | | | | 385/2 |
| 2020/0081189 A1* | 3/2020 | Melloni | ............... | G02B 6/2861 |

* cited by examiner

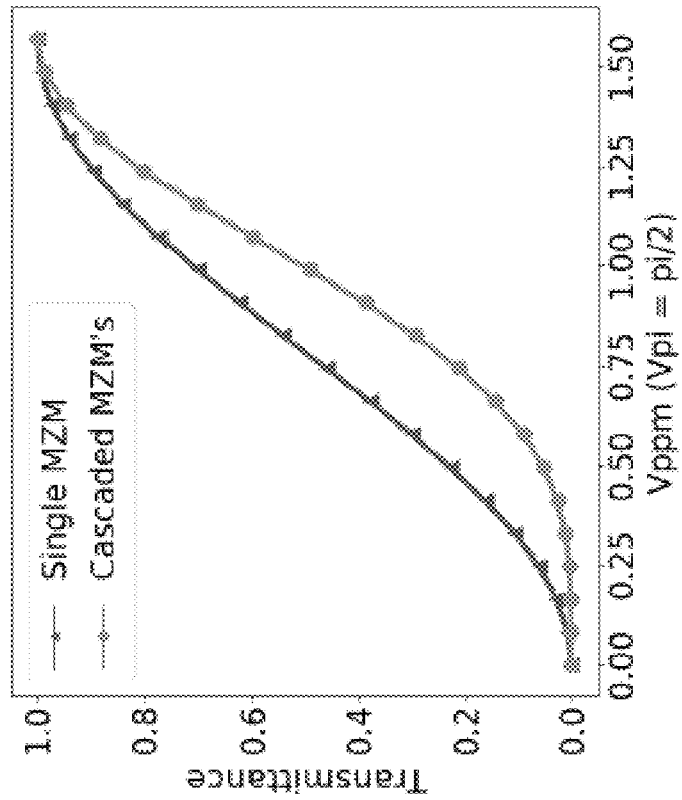
Fig. 3

Fig. 8
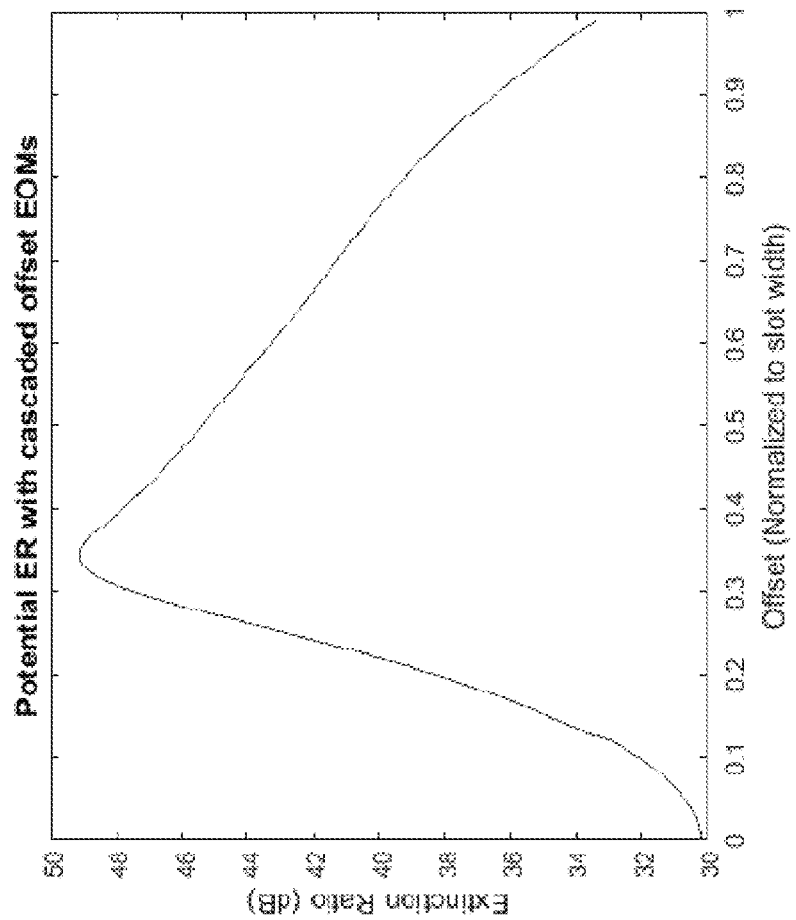
800 

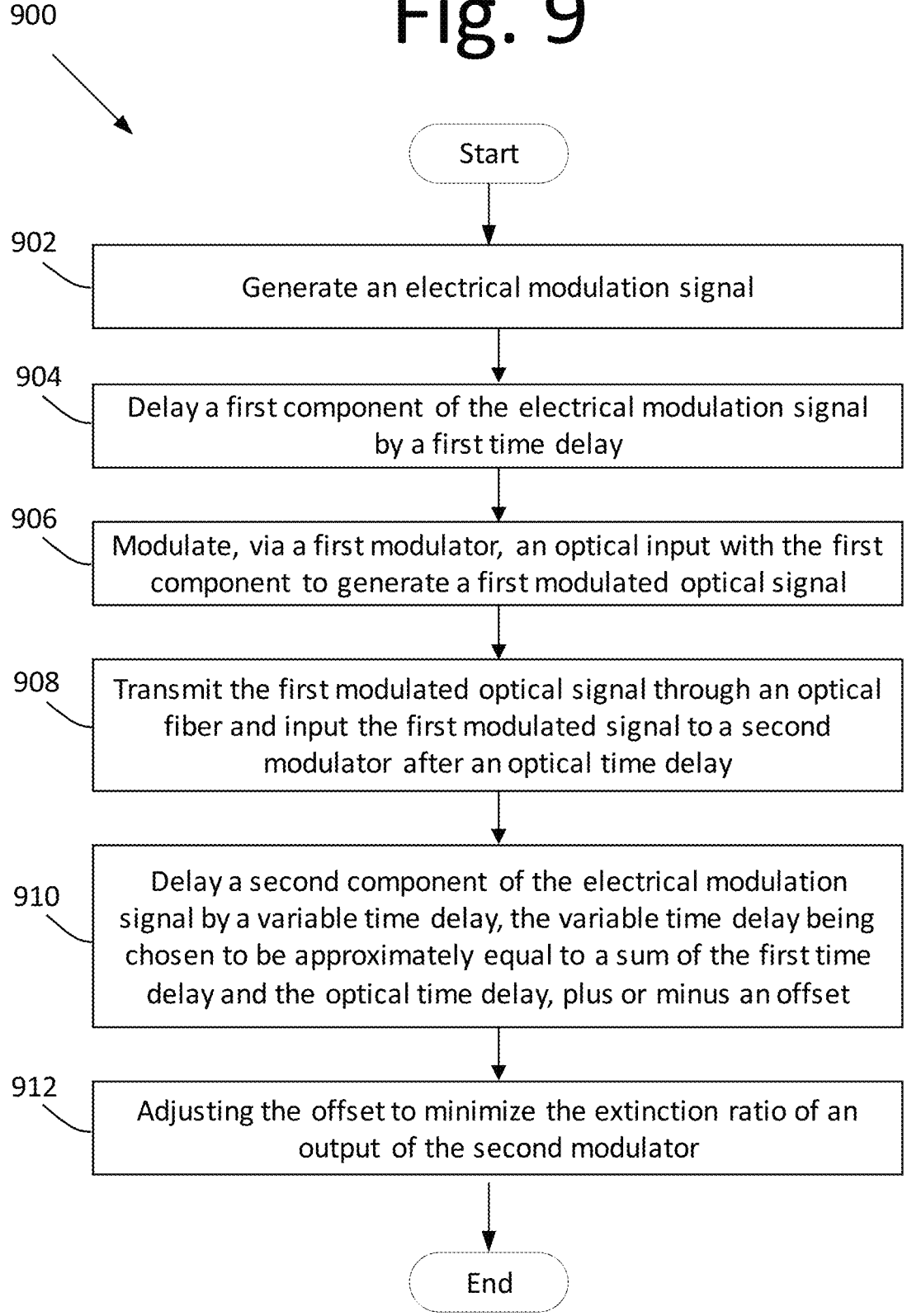

CASCADED OFFSET OPTICAL MODULATOR FOR OPTICAL COMMUNICATIONS

CROSS-REFERENCE TO RELATED APPLICATION

This application claims the benefit of U.S. Provisional Patent Application No. 62/751,124, filed on Oct. 26, 2018. The subject matter thereof is hereby incorporated herein by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention relates to optical communications and, more particularly, to a cascaded modulator system configured to minimize the extinction ratio (ER) of an optical output of an optical transmitter.

BACKGROUND

Software defined radios (SDRs) provide numerous benefits over traditional, analog circuit-based systems, including flexibility, adaptability, and compactness. Such benefits are critical for advancing long distance optical communications (e.g., in a satellite, spacecraft, or other aircraft). There are however numerous obstacles to implementing an SDR in such an optical context. For example, optical communications in deep space may require a signal transmission with an extinction ratio (ER) of 33 dB or higher. These ER requirements are presently difficult to meet due to the discordant requirements of SDRs and the optical modulators used to modulate the optical signal.

Channel coding requirements imposed by current communication standards necessitate strict amplitude and timing characteristics of electrical inputs to the electro-optical modulator. In current SDR configurations, it is impractical to achieve such amplitude and time characteristics for various reasons, such as bandwidth limitations of electronic components as well as field programmable gate array (FPGA) clock speed constraints. As such, SDRs and electro-optical modulators have conflicting implementation restraints, rendering the interface between these components lossy and, for certain applications, to a prohibitively degraded output signal.

Accordingly, an alternative modulation architecture configured to reconcile the complicating implementation requirements of a SDR and an electro-optical modulator may be beneficial.

SUMMARY

Certain embodiments of the present invention may provide solutions to the problems and needs in the art that have not yet been fully identified, appreciated, or solved by current optical modulation systems. For example, some embodiments generally pertain to a cascaded offset optical modulator to correct for non-idealities in the electro-optic subsystem during modulation.

In an embodiment, an apparatus includes a signal source configured to generate a modulation signal and a modulation system communicably coupled to the signal source. The modulation system may include a first Mach Zehnder Interferometer (MZI) and a second MZI serially connected to the first MZI The first MZI is configured to receive an optical signal from a light source and modulate the optical signal with a first portion of the modulation signal to generate a modulated optical signal. A variable time delay $\Delta t_d$ is applied to a second portion of the modulation signal that drives the second MZI such that the second portion modulates the modulated optical signal.

In another embodiment, an apparatus includes a pulse position modulation (PPM) source connected to a plurality of serially-connected MZIs. The modulation signals from the PPM source driving a first MZI and a second MZI are offset such that the first and second MZIs successively modulate light received from a light source.

In yet another embodiment, a method includes generating a modulation signal via a signal source, and driving a first electro-optical modulator with a first portion of the modulation signal having a first time delay $\Delta t_1$ to modulate an optical signal and generate a modulated optical signal. The method may also include modulating, via a second electro-optical modulator, the modulated optical signal with a second portion of the modulation signal having a second time delay $\Delta t_2$ after generation of the modulated optical signal. A variable time delay $\Delta t_d$ is applied to the second portion between the signal source and the second optical modulator, and a total delay encountered by the second portion between the signal source and the second electro-optical modulator is equal to a sum of $\Delta t_1$ and $\Delta t_2$, plus or minus an offset.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a graph illustrating a transfer function to single and cascaded MZI configurations, according to an embodiment of the present invention.

FIG. 8 is a graph illustrating extinction ratio as a function of an offset (normalized to slot width) of optical modulators, according to an embodiment of the present invention.

FIG. 9 is a flow diagram illustrating a process for minimizing the ER of an optical output of an optical transmitter, according to an embodiment of the present invention.

DETAILED DESCRIPTION OF THE EMBODIMENTS

Figure 1:
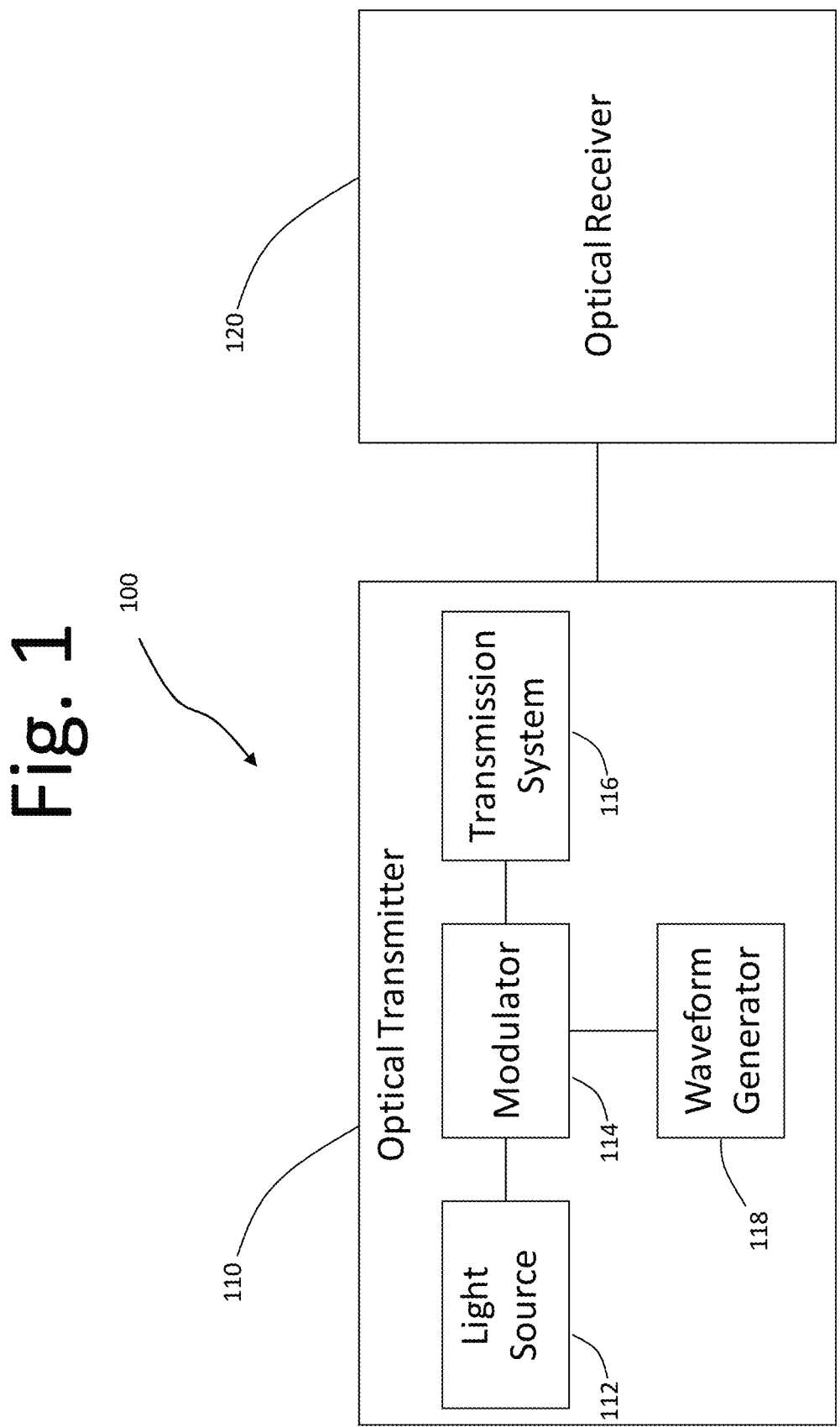
FIG. 1 is a block diagram of an optical communications system, according to an embodiment of the present invention.

Referring generally to the figures, described herein is a modulation architecture configured to improve the extinction ratio (ER) of an optical transmitter of an optical communications system. The modulation architecture described herein may be implemented in various optical communications systems, such as the optical communications system 100 shown in FIG. 1. Referring to FIG. 1, optical communications system 100 includes an optical transmitter 110 and an optical receiver 120. It should be appreciated that the optical transmitter 110 and receiver may be disposed in various contexts depending on the application. For example, in certain implementations, optical transmitter 110 may be disposed or located on a spacecraft or aircraft, while in others, optical transmitter 110 may be located on the earth's surface. Optical receiver 120 may be disposed proximate to a communications base station or any other node of a communications network.

In the example shown, optical transmitter 110 includes a light source 112, a modulator 114, a transmission system 116, and a waveform generator 118. In various embodiments, waveform generator 118 comprises digital circuitry interfacing with other subsystems (e.g., control and sensor circuitry associated with an aircraft or spacecraft upon which optical transmitter 110 is disposed). For example, in some embodiments, waveform generator 118 is a software defined radio (SDR) configured to generate baseband digital signals containing information desired to be communicated with optical receiver 120.

Waveform generator 118 may generate digital signals in accordance with various interface standards. For example, in certain embodiments, waveform generator 118 may generate a low voltage differential signal (LVDS) output. As shown, waveform generator 118 is communicably coupled to optical modulator 114, which serves as an interface between light source 112 and a transmission system 116. In various embodiments, light source 112 is a continuous wave (CW) laser emitting light in a desired communication frequency. Transmission system 116 contains optical components (e.g., amplifiers, magnifiers, reflectors, etc.) configured to condition and direct the modulated optical output towards optical receiver 120.

Modulator 114 is configured to encode information onto the optical signal provided by light source 112 for transmittal. Optical modulator 114 may utilize a channel coding scheme of choice. For example, in certain embodiments, a PPM scheme may be utilized. Various existing communications systems utilize a MZI for this purpose. MZIs are analog components possessing the following periodic transfer function.

$$I(V) = \sin^2\left(\frac{\pi V}{2V_\pi}\right), \quad \text{Equation (1)}$$

where I is the intensity of the output and $V_\pi$ is the half-wave voltage of the modulator. Such a transfer function possesses isolated null points (zero voltage outputs), which significantly contrasts with digital components, where a range of voltage inputs—any voltage below a certain threshold level (VIL)—generates a null output. In practice, it is difficult to pin the logic low signal of digital components to the isolated null in the MZI transfer function. When digital low outputs inevitably deviate from the MZI's null points, the MZI will output some positive voltage, diminishing ER.

Other difficulties with MZIs arise from chosen channel encoding schemes. For example, optimized PPM systems require a correctly positioned square wave input to the MZI to maximize signal energy within a signal slot and minimize signal energy in adjacent slots. In practice, however, it is not possible to generate an ideal square wave due to the infinite bandwidth required. Any real pulse has less than infinite bandwidth and therefore is larger than the slot width. This forces unwanted signal energy into adjacent slots, which directly contributes to Inter-Slot Interference (ISI). This ISI contributes directly to the probability of a photon being detected in the wrong slot, contributing to bit errors. Minimizing such bit errors to achieve a high ER thus requires that the pulse width be less than the slot width to correct for the finite bandwidth of the system.

Another disadvantage associated with MZIs can stem from a chosen interface standard with waveform generator 118. Certain embodiments may utilize LVDS, which uses two outputs having a common DC component and inverted data signals with respect to one another. Many MZIs and associated drivers utilize an unbalanced input, which means that one of the LVDS outputs from waveform generator 118 must be terminated, resulting in only half of the output being utilized, further degrading signal quality.

In view of the above deficiencies associated with using a single MZI to interface between light source 112 and transmission system 116, described herein is an optical modulation subsystem that relieves waveform generator 118 of the extreme signal quality requirements imposed by the use of a MZI. In various embodiments, such signal quality requirements are relieved via the addition of at least a second MZI serially connected connect a first MZI and a variable time delay. Although various embodiments utilize one or more MZIs, other modulators may be used depending on the system requirements. However, for purposes of explanation, MZI will be used to explain the various embodiments. Such additions allow for compensation of imperfections in the electrical signal provided by waveform generator 118. The serialized nature of the modulator allows for an overall transfer function that pushes toward desired digital characteristics. This not only solves the problems caused by the use of digital components but also helps remove noise and corrects for VIL.

Further, the addition of the second MZI also allows for use of the second LVDS signal without the need for unbalancing. Finally, the modulator allows the introduction of a time offset to the modulation of each MZI. This allows for precise control of the pulse width within the signal slot and optimization of ER and ISI for a given signal with various non-ideal characteristics and finite bandwidths.

Figure 2:
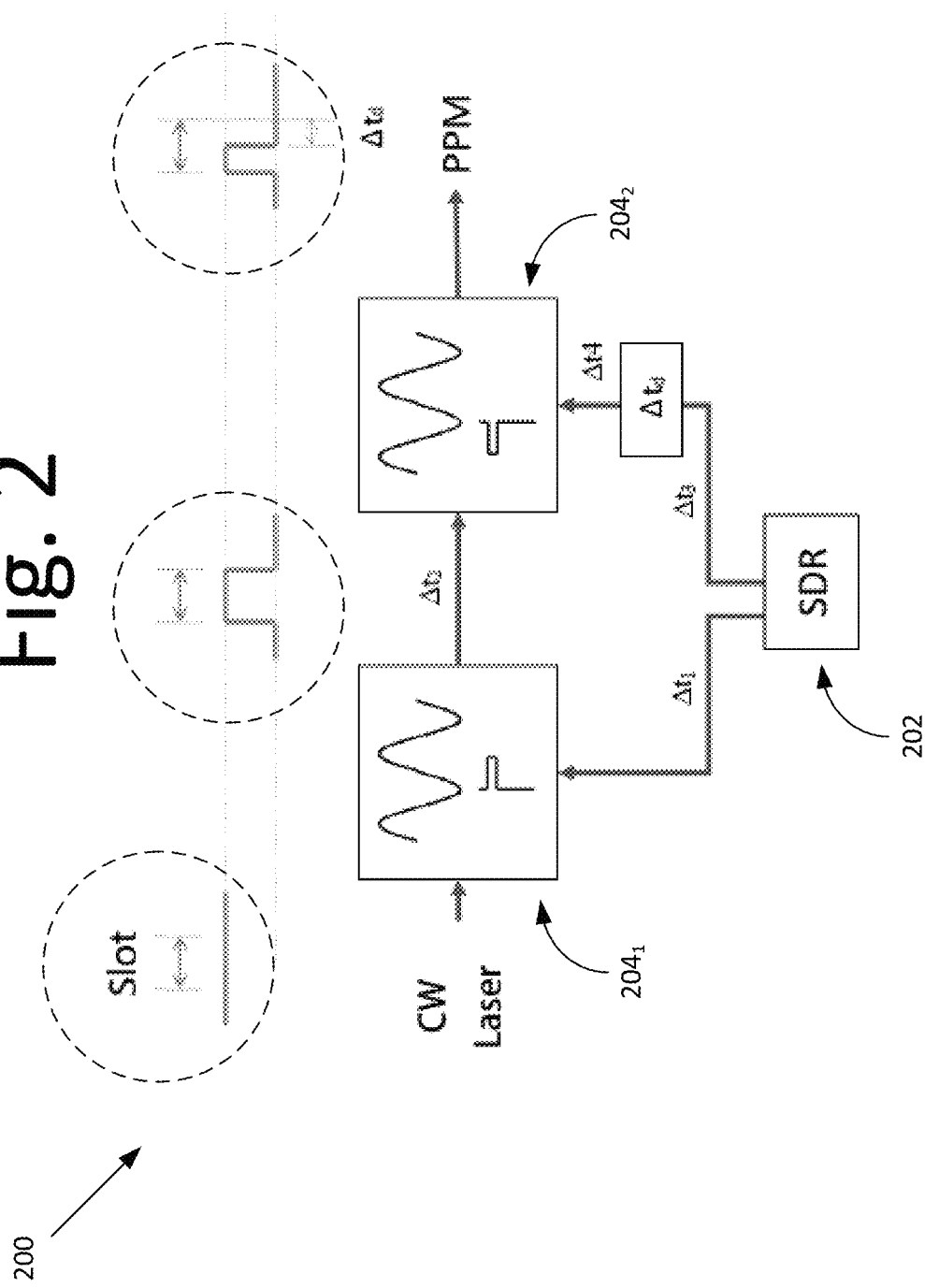
FIG. 2 is a block diagram illustrating a cascaded offset optical modulator, according to an embodiment of the present invention.

FIG. 2 is a block diagram illustrating a cascaded offset optical modulator 200, according to an embodiment of the present invention. Optical modulator 200 may be used as modulator 114 shown in FIG. 1 in various embodiments. In some embodiments, cascaded offset optical modulator 200 includes MZI $204_1$ and MZI $204_2$, with an adjustable phase delay $\Delta t_d$ being applied to MZI $204_2$. It should be appreciated that the embodiments are not limited to two MZIs; other embodiments may include a plurality of MZIs. However, the number of MZIs depends on the design configuration of cascaded offset optical modulator 200.

During operation, a continuous wave (CW) laser is applied to a fiber optic input port of MZI $204_1$. In the embodiment shown, MZI $204_1$ is then modulated by a positive LVDS component of a PPM signal through a cable of a length that induces a time delay of $\Delta t_1$ (seconds). The output of MZI $204_1$ is applied to the input of MZI $204_2$ through an optical fiber introducing time delay $\Delta t_2$.

MZI $204_2$ is then modulated by a negative LVDS component of the PPM signal through a longer cable, having a time delay $\Delta t_3 + \Delta t_4 + \Delta t_d$. A bias point of MZI $204_2$ is set to an inverting bias point to account for the inverted input signal. Cascaded offset optical modulator 200 is designed such that when $\Delta t_d=0$, then time delays $\Delta t_1 + \Delta_{t2}$=time delays $\Delta_{t3} + \Delta t_4$. In other words, the electrical signal and optical signal are aligned to recombine at MZI $204_2$. As time delay $\Delta t_d$ is adjusted, the optical signal and the electrical signal become misaligned. This misalignment may cause the signal slot to be reduced in duration by the same length as time delay $\Delta t_d$.

Both outputs from SDR (or PPM source) 202 are used to drive respective MZIs $204_1$, $204_2$. By using the available signal, the quality of the signal transfer is increased. However, because LVDS is a balanced signal standard, the negative portion is inverted to modulate correctly. Fortunately, the periodic nature of MZIs $204_1$, $204_2$ allow for this. By increasing or decreasing the bias potential of MZI $204_1$ and/or $204_2$ by $V\pi/2$, the electrical signal is effectively inverted. This inversion is easier to accomplish than unbalancing and does not cause a loss in fidelity.

In some embodiments, an ideal transfer function for an optical modulator is a step function. A step function allows a range of input potential that achieve a very precise binary valued output.

$$I_{ideal}(V_{PPM}) = \begin{cases} 1, & 0 < V_{PPM} < \pi \\ 0, & \text{elsewhere} \end{cases} \quad \text{Equation (2)}$$

where $I_{ideal}$ is the ideal transfer function and $V_{PPM}$ is the electrical potential of the input waveform.

It should be appreciated that a transfer function corresponding to a step function is not possible to build in practice due to the bandwidth constraints, which were discussed earlier in this application. However, the cascading of two MZI's changes the overall transfer function of optical modulator 200 toward something that is more helpful. This new transfer function is closer to the ideal than that of a single MZI By applying the MZI transfer function equation to the system, the following equation for the intensity output of MZI $204_1$ (or MZI1) may be used.

$$I_{MZM1}(V_P) = 1 * \sin^2\left(\frac{\pi}{2} \frac{V_P}{V_\pi}\right) \quad \text{Equation (3)}$$

where $I_{MZM1}$ is the light intensity output of 1MZI1 and $V_P$ is the electrical potential of the positive LVDS waveform.

To obtain the output for MZI $204_2$ (MZI2), the non-continuous nature of the input light is considered. Note that the input is no longer one, but the modulated output from MZI $204_1$. Thus, the intensity for the output of MZI $204_2$ becomes:

$$I_{MZM2}(V_P, V_N) = I_{MZM1}(V_P) * \sin^2\left(\frac{\pi}{2} \frac{V_N + \Delta t_d}{V_\pi}\right) \quad \text{Equation (4)}$$

where $I_{MZM2}$ is the light intensity output of 2MZI2 and $V_N$ is the electrical potential of the negative LVDS waveform.

Equation (5) may be simplified when $\Delta t_d=0$. Furthermore, accounting for the periodic nature of the MZI and assuming optical modulator 200 is properly biased, the following equation is used.

$$V_P = V_N = V_{PPM} \quad \text{Equation (5)}$$

$$I(V_{PPM}) = \sin^4\left(\frac{\pi}{2} \frac{V_{PPM}}{V_\pi}\right) \quad \text{Equation (6)}$$

where $I(V_{PPM})$ is the light intensity of the modulated signal.

This result shows that the cascading of MZIs increases the order of the transfer function by two with the addition of each new modulator. A visualization of the impact can be seen in FIG. 3, which is a graph 300 illustrating a transfer function to single and cascaded MZI configurations, according to an embodiment of the present invention. As shown in graph 300, the range in which destructive interference occurs is dramatically expanded. This not only allows for lightening of the SDR signal quality requirements but also functions as a filter for low amplitude signals which effectively filters noise. The impact of this noise filtering corrects for the VIL of the SDR.

Pulse Shortening

Figure 4:
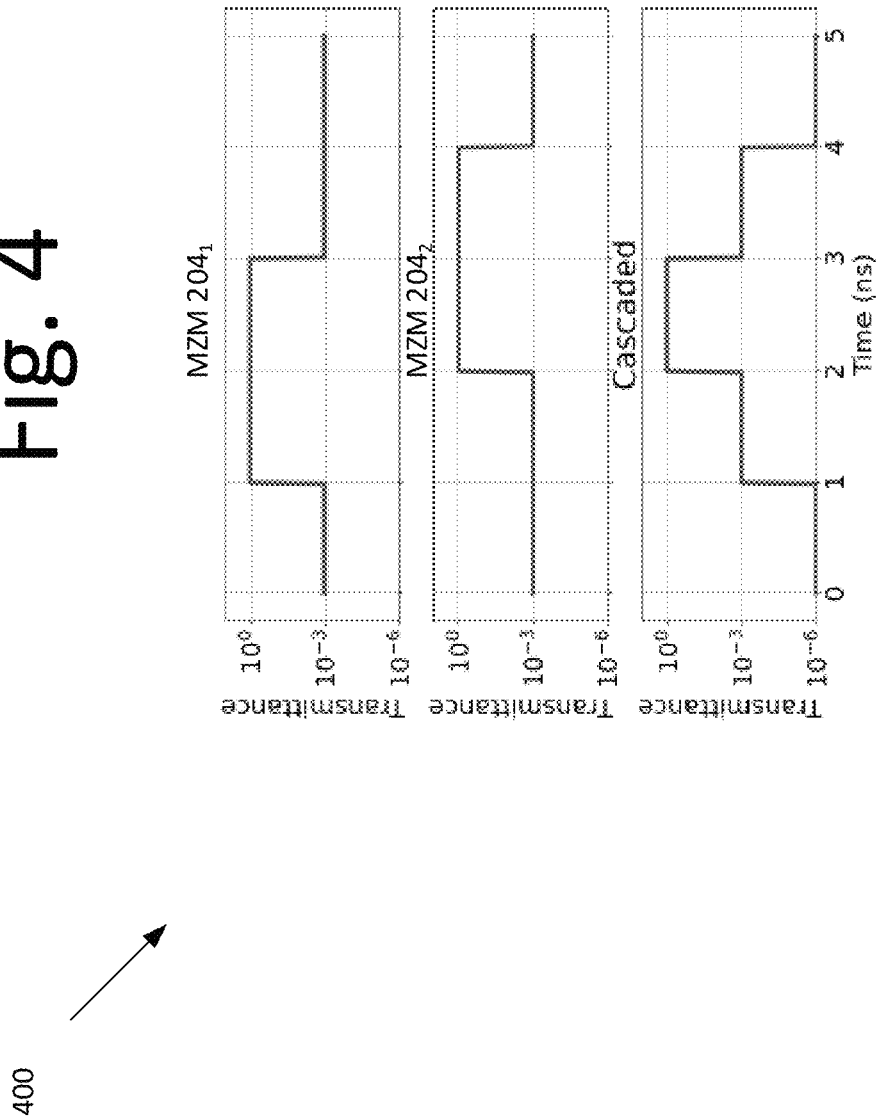
FIG. 4 is a diagram illustrating serialization timing for cascaded modulators, according to an embodiment of the present invention.

FIG. 4 is a diagram 400 illustrating serialization timing, according to an embodiment of the present invention. Diagram 400 shows an illustrative output of modulation system 200, which demonstrated the pulse shortening function. In this case, the pulse width is 2 ns and the MZIs are 1 ns offset from each other. Each modulator is assumed to provide 30 dB of attenuation and no insertion loss. In the logarithmic scale, the output pulse is a stair step shape. The signal peak appears where the pulses from MZI $204_1$ and MZI $204_2$ overlap. On both sides of the peak signal area, there is a region where one MZI is attenuating and the other is not. This creates a step like structure on both sides of the pulse. It is in these stair step regions that the pulse carving takes place. Outside of these regions, both MZI $204_1$ and MZI $204_2$ are attenuating and the attenuation adds linearly. In this example, a 2 ns electrical pulse was shortened to 1 ns from the 1 ns offset between MZI $204_1$ and MZI $204_2$. The shortening of the pulse and resulting reduction in ISI contributes significantly to an increase in ER.

Test Setup

Figure 5:
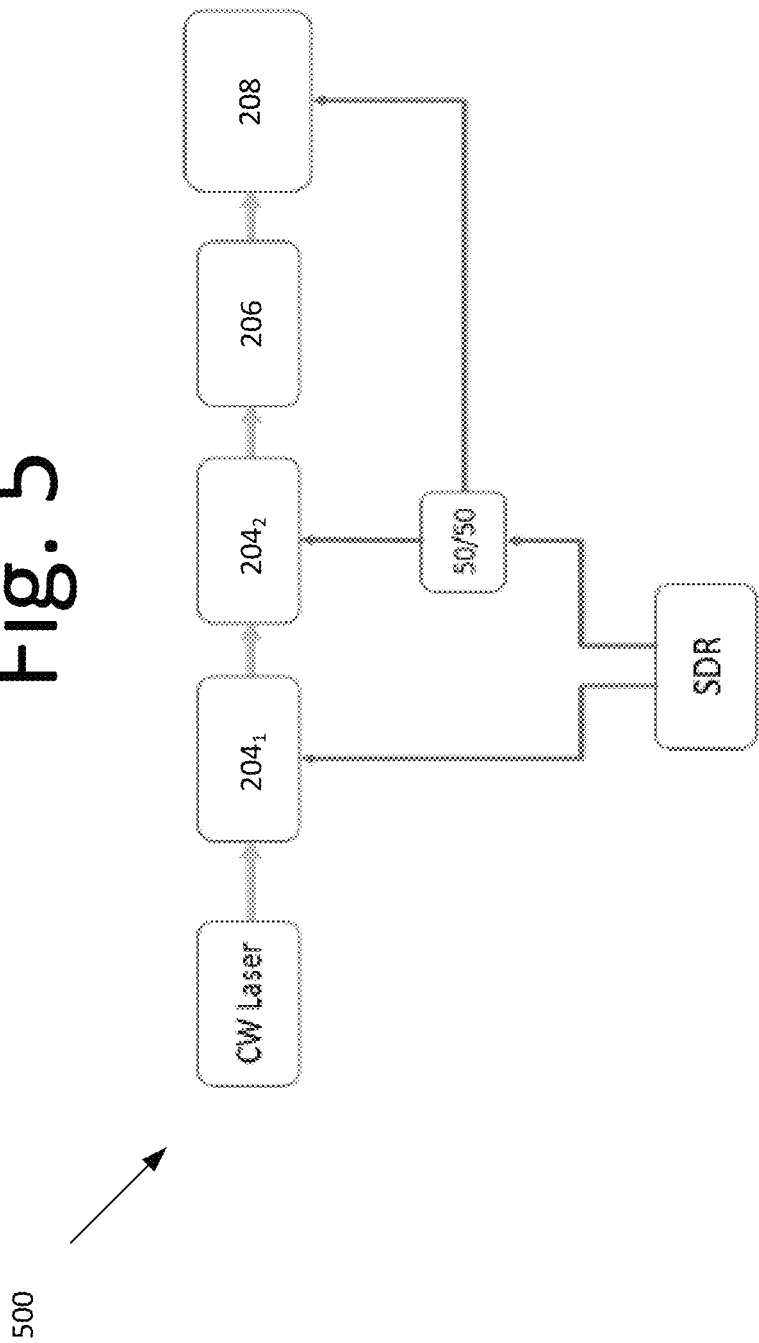
FIG. 5 is a block diagram illustrating a testing system for the cascaded offset optical modulator, according to an embodiment of the present invention.

FIG. 5 is a block diagram illustrating a testing system 500 for the cascaded offset optical modulator, according to an embodiment of the present invention. In some embodiments, testing system 500 includes two separate MZIs $204_1$ and $204_2$ with a capability of producing a DC ER of more than 40 dB. Each MZI $204_1$ and $204_2$ was manually biased using a single SNSPD 206 and a time-to-digital converter 208 to count photon detection events. Time-to-digital converter 208 was synchronized to the electrical pulse of MZI $204_1$.

A periodic signal with a constant duty cycle of 1:320 and a slot width of 1 ns was injected into testing system 100. This periodic signal is equivalent to a repeating PPM 256 signal with a 25% guard time. The intensity of the continuous wave laser input was attenuated with a fiber optic attenuator to allow for the use of single channel a superconducting nanowire single-photon detector (SNSPD) 206. Time-to-digital converter 208 was set to record a histogram over 1 period at a resolution of 100 ps per bin. A measurement with the laser off was taken to determine the dark count rate of SNSPD 206. Histograms of photon counts were recorded at a series of eight different offsets. The mean dark count was subtracted from each bin to correct for measurement noise. The measurement was not corrected for detector jitter.

Results

Figure 6:
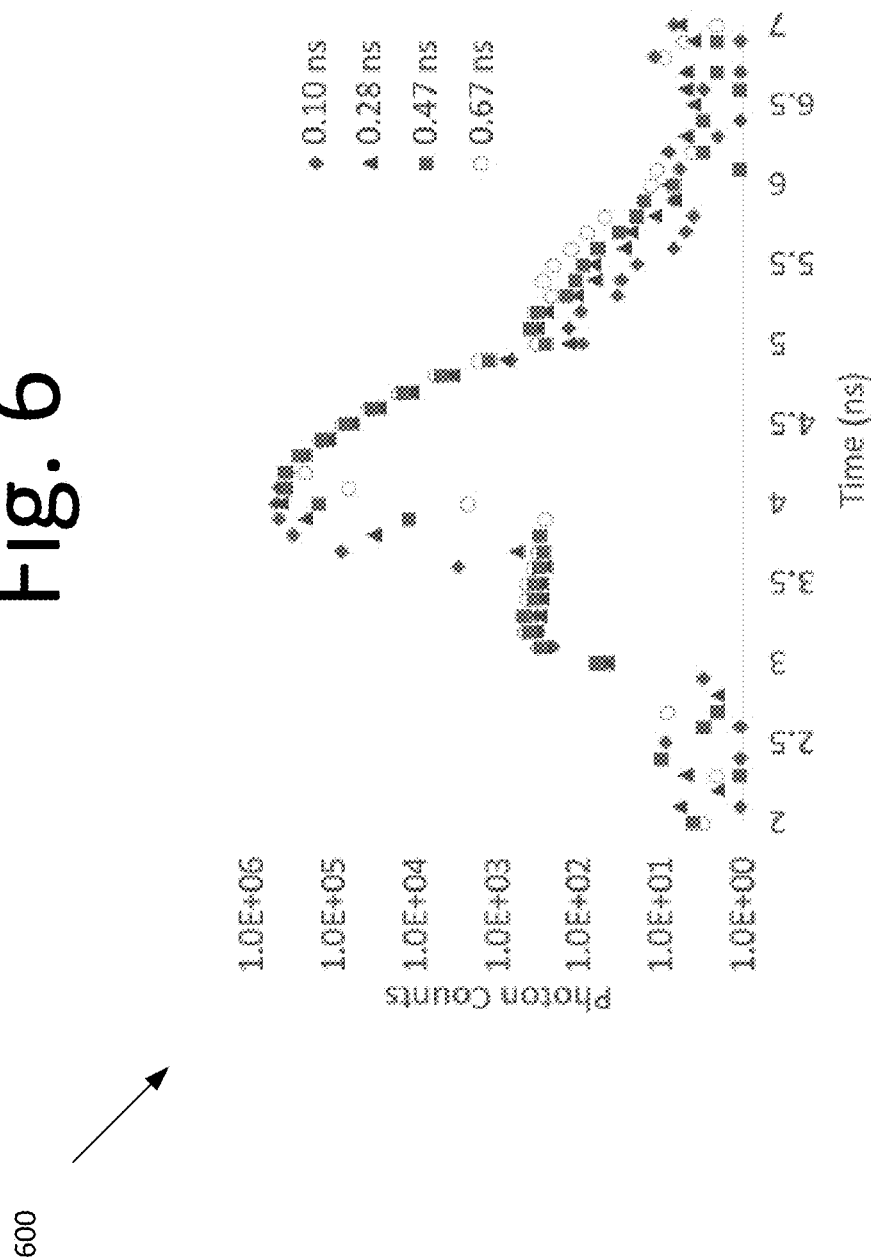
FIG. 6 is a histogram illustrating photon counts in logarithmic scale at a series of offsets, according to an embodiment of the present invention.
Figure 7:
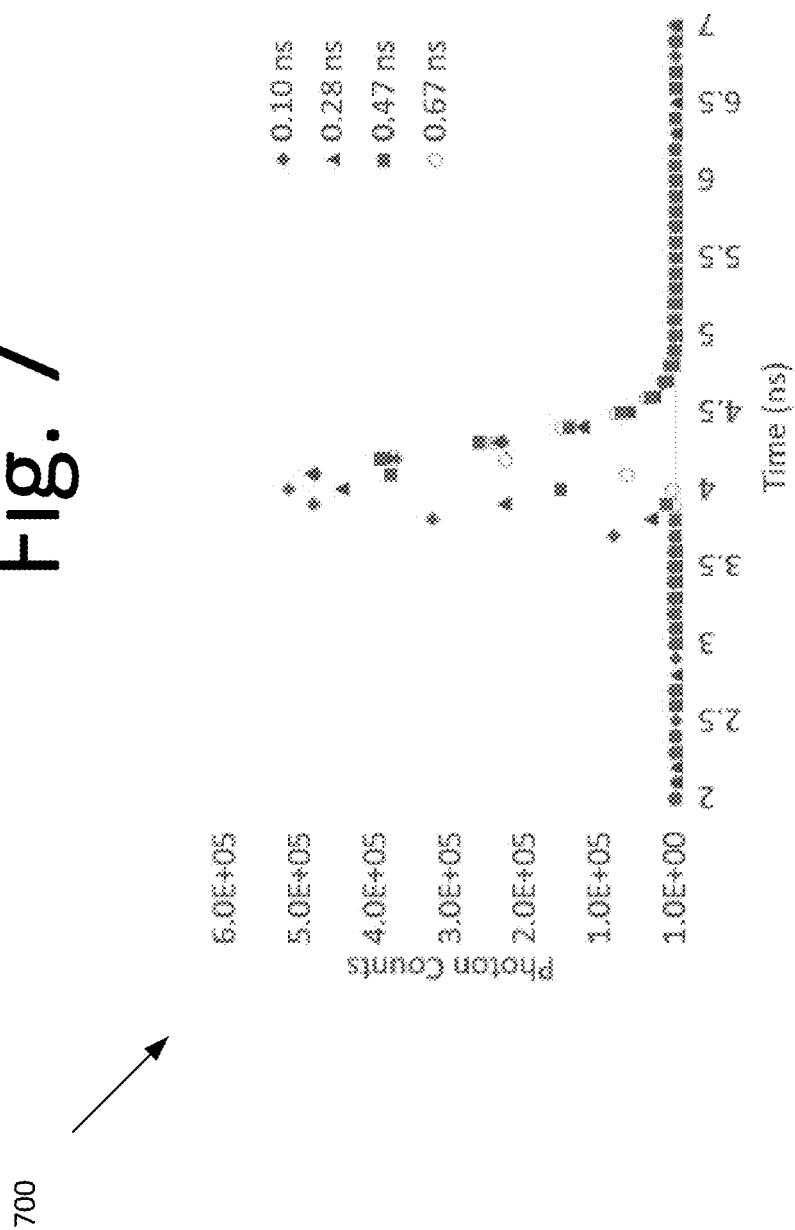
FIG. 7 is a histogram illustrating photon counts in linear scale at a series of offsets, according to an embodiment of the present invention.

FIGS. 6 and 7 are histograms 600 and 700 for the series of offsets generated via testing system 500. The offsets are labeled by the offset setting of the delay module ($\Delta t_d$) and not the overall offset of the MZI's. FIGS. 6 and 7 show the same data at different scales. As shown, the histogram 600 illustrates photon counts in logarithmic scale at a series of offsets, while the histogram 700 illustrates photon counts in linear scale at a series of offsets, according to an embodiment of the present invention.

As depicted in histograms 600 and 700, MZI $204_2$ forms clear edges in the photon count data, showing the impact of the offset carving described herein. To render the offsets visible, the time-to-digital instrument was synchronized to MZI $204_1$. It is clearer in the linear scale of the histogram 700 that the pulses have been shortened enough to contain most of the energy within a 1 ns slot (between approximately 3.7 ns and 4.7 ns).

To determine the ER for each offset, the slot phase must be determined. This function is usually reserved for the SDR receiver, which must recover the clock in order to decode the signal. In this case, however, each histogram is correlated with an ideal pulse to determine the phase of maximum correlation. Using this slot positioning, $t_1$ and $t_2$ were determined and Equation (2) was used to calculate the ER for each offset. To determine the ER potential for lower order PPM signals, the unused off bits were removed from the calculation. The off bit before and after the slot were included in the calculation to include all ISI. The resultant ER for PPM orders at each offset in the recorded series. See, for example, Table 1 below.

TABLE 1

Extrapolated ER Potential of Pulses for a Series of Offsets

| Phase | Extinction Ratio (dB) | | | | | |
|---|---|---|---|---|---|---|
| Delay (ns) | PPM-4 | PPM-16 | PPM-32 | PPM-64 | PPM-128 | PPM-256 |
| 0.00 | 28.4 | 35.1 | 38.1 | 40.4 | 43.2 | 45.9 |
| 0.10 | 30.5 | 37.0 | 39.8 | 41.9 | 44.5 | 47.1 |
| 0.19 | 28.0 | 34.8 | 37.7 | 40.2 | 43.0 | 45.7 |
| 0.29 | 32.5 | 39.1 | 41.6 | 43.3 | 45.8 | 48.2 |
| 0.38 | 30.3 | 37.0 | 39.8 | 41.9 | 44.6 | 47.2 |
| 0.48 | 31.1 | 37.6 | 40.3 | 42.4 | 45.0 | 47.5 |
| 0.57 | 29.3 | 36.0 | 38.8 | 41.1 | 43.8 | 46.4 |
| 0.67 | 27.9 | 34.6 | 37.5 | 40.0 | 42.7 | 45.2 |

MZI Offset and Slot Width Clipping

The addition of a second modulator beneficially offers an extra set point. In the example shown and described with respect to FIGS. 2-5 herein, the LVDS is broken into two paths at the LVDS output of the PPM. These two signals are recombined at MZI $204_2$ and therefore have to be aligned. These two signals are intentionally misaligned by varying $\Delta t$. By misaligning the two signals, the control over the width of the pulse is realized. The maximum width of a pulse is realized when $\Delta t=0$. As $\Delta t$ increases, the modulators misalign and cut into the signal pulse. This decreases the width of the pulse proportional to the value of $\Delta t$.

FIG. 8 is a graph illustrating ER as a function of an offset $\Delta t$ (normalized to slot width) for a modulation system (such as the modulation system 200), according to an embodiment of the present invention. For example, FIG. 8 shows a simulation of the impact the offset has on ER. Real test data from the NASA optical SDR test bed was used for this simulation. The test data showed a 20 dB ER using a single MZI, which is typical of current commercially available systems. The test data was simulated using the cascaded offset configuration over a sweep of one full slot $\Delta t$. With no offset, the cascaded modulator brings the ER to 30 dB. As the offset is increased, the offset clips off some of the non-idealities of the signal and the ER increases significantly. A 35% offset maximizes the ER at approximately 49 dB. As the offset increases further, more of the slot is destroyed than is useful and the slot power begins to fall off, which reduces ER. This simulation shows that pulse width optimization alone can increase ER by 19 dB on the measured signal. With the cascading effect of 10 dB included, the total improvement in ER is 29 dB. For this particular signal, a 35% offset should be maintained for transmission to maximize ER.

In some embodiments, modulating a signal for optical transmission imposes unique challenges. For example, a single MZI cannot reach the design goal of 40 dB ER when driven by a system where the pulse width and slot width are equal. Among the other challenges at this interface are the fundamental difference between the function of digital components and the ER requirements of an analog optical modulator, both in amplitude and in time. The optical modulation subsystem discussed herein addresses all of these challenges. Measurement and analysis of the system proves that for a 1 ns pulse width, a 40 dB ER was achieved for PPM orders above 32. Thus, this ER should meet the needs of a deep space optical transmitter.

FIG. 9 is a flow diagram illustrating a process 900 for minimizing the ER of an optical output of an optical transmitter. In some embodiments, process 900 begins at 902 with the generation of an electrical modulation signal. At 904, a first component of the electrical modulation signal is delayed by a first time delay. At 906, an optical input is modulated by a first modulator with the first component to generate a first modulated optical signal. At 908, the first modulated optical signal is transmitted through an optical fiber and an input of the first modulated signal to a second modulator after an optical time delay. At 910, a second component of the electrical modulation signal is delayed by a variable time delay. The variable time delay is chosen to be approximately equal to a sum of the first time delay and the optical time delay, plus or minus an offset. Finally, at 912, the offset is adjusted to minimize the extinction ratio of an output of the second modulator. Some embodiments generally pertain to an apparatus that includes a PPM source connected to a plurality of serially-connected MZIs. A variable time delay $\Delta t_d$ may be applied to a single portion of an equally divided signal of any physical standard. This variable time delay may drive a second or later MZI of the plurality of MZIs to eliminate or compensate for one or more non-idealities in an electrical signal.

Although some embodiments described herein use the cascaded offset optical modulator for deep space optical communication, one or more of these embodiments are not limited to deep space optical communications. Instead, the cascaded offset optical modulator may be use in any optical transmission system, which requires high fidelity binary pulses, without a complex component. For example, the cascaded offset optical modulator may be used as a drop to upgrade many currently existing optical transmitters, not only in free space, but also in fiber. This represents an extremely wide opportunity in an emerging and quickly growing market.

The system could also be implemented in different ways. With an increase in ER, the a personal of ordinary skill in the art has the choice of using the excess ER for channel capacity or simplifying other parts of the system. The extra ER could be traded for reduced laser power, elimination of optical amplifiers, decreased system complexity and efficiency etc.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising: a signal source configured to generate a modulation signal; and a modulation system communicably coupled to the signal source, wherein the modulation system comprises a first Mach Zehnder Interferometer (MZI) and a second MZI serially connected to the first MZI, wherein the first MZI is configured to receive an optical signal from a light source and modulate the optical signal with a first portion of the modulation signal to generate a modulated optical signal, wherein a variable time delay $\Delta td$ is applied to a second portion of the modulation signal that drives the second MZI such that the second portion modulates the modulated optical signal, wherein a first time delay of $\Delta t1$ is applied to the first portion of the modulation signal prior to the first portion modulating the optical signal, wherein the modulated optical signal is delayed by a second time delay of $\Delta t2$ prior to being modulated by the second MZI, and wherein a sum of the first time delay $\Delta t1$ and the second time delay $\Delta t2$ equals a sum of $\Delta td$ and additional delays encountered by the second portion between the signal source and the second MZI minus an offset.

2. The apparatus of claim 1, wherein the optical signal from the light source is a continuous wave (CW) laser introduced to the first MZI.

3. The apparatus of claim 1, wherein the offset determines a pulse width of an output signal of the modulation system.

4. The apparatus of claim 3, wherein the modulation signal is a low voltage differential signal comprising a positive portion and a negative portion, wherein the first portion is the positive portion and the second portion is a negative portion.

5. An apparatus, comprising:
a pulse position modulation (PPM) source connected to a plurality of serially-connected Mach Zehnder Interferometers (MZIs), wherein
modulation signals from the PPM source driving a first MZI and a second MZI are offset such that the first and second MZIs successively modulate light received from a light source, wherein
the PPM source generates a first portion of a modulation signal that is delayed by a time delay of $\Delta t_1$ seconds prior to being input into the first MZI and a second portion of the modulation signal that is delayed by a variable time delay of $\Delta t_d$ seconds prior to being input into the second MZI, and wherein
the first MZI is configured to modulate an optical signal received from the light source with the first portion of the modulation signal to produce a modulated optical signal that is delayed by a time delay of $\Delta t_2$ seconds prior to the modulated optical signal being input into the second MZI, wherein a sum of $\Delta t_1$ and $\Delta t_2$ equals $\Delta t_d$ minus the offset.

6. The apparatus of claim 5, wherein the second MZI is configured to modulate the modulated optical signal with the second portion of the modulation signal.

7. The apparatus of claim 6, wherein the first and second portions are positive and negative low voltage differential signal (LVDS) outputs, respectively.

8. The apparatus of claim 7, wherein a bias point of the second MZI is set to an inverting bias point to balance the first and second portions.

9. The apparatus of claim 6, wherein the first and second portions both have an input pulse width, wherein an output optical signal of the plurality of serially-connected MZIs has an output pulse width that equals the input pulse width minus the offset.

10. A method, comprising:
generating a modulation signal via a signal source;
driving a first electro-optical modulator with a first portion of the modulation signal having a first time delay $\Delta t_1$ to modulate an optical signal and generate a modulated optical signal;
modulating, via a second electro-optical modulator, the modulated optical signal with a second portion of the modulation signal having a second time delay $\Delta t_2$ after generation of the modulated optical signal, wherein a variable time delay $\Delta t_d$ is applied to the second portion between the signal source and the second optical modulator, wherein a total delay encountered by the second portion between the signal source and the second electro-optical modulator is equal to a sum of $\Delta t_1$ and $\Delta t_2$, plus or minus an offset.

11. The method of claim 10, wherein the signal source is a pulse position modulation (PPM) source.

12. The method of claim 10, wherein the first and second portions of the modulation signal possess a common pulse width, wherein an output pulse width of the second electro-optical modulator is the common pulse width minus the offset.

13. The method of claim 12, further comprising adjusting the variable time delay $\Delta t_d$ such that the offset is between 20% and 80% of the common pulse width.

14. The method of claim 13, wherein the variable time delay $\Delta t_d$ is adjusted such that the offset is between 30% and 40% of the common pulse width.

15. The method of claim 14, wherein the first and second portions are positive and negative portions of a low voltage differential signal, respectively.

16. The method of claim 15, further comprising biasing the second electro-optical modulator to balance the first and a second portions.

17. The method of claim 10, further comprising adjusting the offset to maximize the extinction ratio of an output.

* * * * *